US011227737B2

(12) United States Patent
Emery et al.

(10) Patent No.: US 11,227,737 B2
(45) Date of Patent: Jan. 18, 2022

(54) THERMAL FUSE SLEEVING

(71) Applicant: SAFT AMERICA, Cockeysville, MD (US)

(72) Inventors: Alain Emery, Hahira, GA (US); Gary Leasure, Valdosta, GA (US)

(73) Assignee: SAFT AMERICA, Cockeysville, MD (US)

( * ) Notice: Subject to any disclaimer, the term of this patent is extended or adjusted under 35 U.S.C. 154(b) by 0 days.

(21) Appl. No.: 16/727,523

(22) Filed: Dec. 26, 2019

(65) Prior Publication Data
US 2021/0202202 A1 Jul. 1, 2021

(51) Int. Cl.
H01H 85/02 (2006.01)
H01M 50/543 (2021.01)
H01H 85/165 (2006.01)
H01M 10/42 (2006.01)
H01M 10/48 (2006.01)
H02G 3/02 (2006.01)
H02J 7/00 (2006.01)

(52) U.S. Cl.
CPC ...... H01H 85/0241 (2013.01); H01H 85/165 (2013.01); H01M 10/425 (2013.01); H01M 10/48 (2013.01); H01M 50/543 (2021.01); H02G 3/02 (2013.01); H02J 7/0031 (2013.01); H01M 2200/00 (2013.01)

(58) Field of Classification Search
CPC .. H01H 85/0241; H01H 85/165; H01H 85/17; H01H 85/175; H01H 85/1755; H01H 85/38; H01H 2085/025; H01H 2085/381; H01M 2200/00
See application file for complete search history.

(56) References Cited

U.S. PATENT DOCUMENTS 3,708,611 A * 1/1973 Dinger ............... H02G 15/1806
174/84 C
4,555,451 A * 11/1985 Harrod ................. H01M 2/348
429/1
4,855,705 A 8/1989 Narancic et al.
5,604,474 A * 2/1997 Leach ................. H01H 85/042
337/158
5,645,448 A * 7/1997 Hill ........................ H01M 2/34
439/522

(Continued)

FOREIGN PATENT DOCUMENTS

EP 0 283 414 A2 9/1988
EP 2 557 581 A1 2/2013

(Continued)

Primary Examiner — Jacob R Crum
(74) Attorney, Agent, or Firm — Sughrue Mion, PLLC

(57) ABSTRACT

Provided is a battery that may include a first terminal or cable, a second terminal or a cable, a thermal fuse configured to connect to the first terminal or cable and the second terminal or cable, a first sleeving layer that is disposed on the thermal fuse, and that is configured to muffle an arc explosion of the thermal fuse and encapsulate molten material generated by the arc explosion of the thermal fuse, and a second sleeving layer that is disposed on the first sleeving layer, and that is configured to encapsulate the molten material generated by the arc explosion of the thermal fuse that penetrates the first sleeving layer. An overcurrent protection system and a sleeving are also provided.

17 Claims, 11 Drawing Sheets

(56) References Cited

U.S. PATENT DOCUMENTS

| | | | | |
|---|---|---|---|---|
| 5,714,923 A | * | 2/1998 | Shea | H01H 85/055 |
| | | | | 337/142 |
| 5,903,208 A | * | 5/1999 | Sorger | H01H 85/38 |
| | | | | 337/158 |
| 6,160,471 A | * | 12/2000 | Rybka | H01H 85/055 |
| | | | | 337/273 |
| 8,021,190 B2 | * | 9/2011 | Groeller | H01R 11/287 |
| | | | | 439/620.26 |
| 2007/0099073 A1 | * | 5/2007 | White | H01M 2/1055 |
| | | | | 429/158 |
| 2008/0122571 A1 | * | 5/2008 | Buchanan | H01H 85/18 |
| | | | | 337/276 |
| 2011/0008655 A1 | * | 1/2011 | White | H01M 2/1055 |
| | | | | 429/62 |
| 2012/0160297 A1 | | 6/2012 | Yamakawa et al. | |
| 2015/0050531 A1 | * | 2/2015 | Felser | H01M 2/204 |
| | | | | 429/61 |
| 2015/0137934 A1 | * | 5/2015 | von zur Muehlen | |
| | | | | H01H 85/042 |
| | | | | 337/273 |
| 2017/0214033 A1 | * | 7/2017 | Takano | H01M 2/206 |

FOREIGN PATENT DOCUMENTS

| | | |
|---|---|---|
| GB | 2126808 A | 3/1984 |
| JP | 2000-231866 A | 8/2000 |
| JP | 2004-152701 A | 5/2004 |
| JP | 2008-269903 A | 11/2008 |

* cited by examiner

THERMAL FUSE SLEEVING

FIELD

The present disclosure is directed to a sleeving for a high current and low voltage thermal fuse acting as an overcurrent protection. The sleeving is comprised of two distinct layers. The first sleeving layer may be comprised of a braided fiber glass sleeve that muffles the arc explosion occurring during a low or high impedance short circuit, may act as a first level containment and encapsulation for any melted material generated by the short circuit, and may offer a first layer of thermal insulation.

The second sleeving layer may be comprised of high temperature silicone coated fiberglass, may be open at both ends, may trap any melted material that can eventually permeate the first layer of braided fiber glass sleeving, and may provide thermal insulation.

The sleeving construction may be efficient and economical, thereby allowing construction and implementation of custom sized fuses for low volume production at a low cost.

BACKGROUND

High current fuses typically rely on an arc-quenching filler to absorb the arc explosion, block the electrical arc, and trap melted material. However, for low voltage applications, only the arc explosion protection and melted material trapping functions might be required. Also, traditional fuse construction has a rigid enclosure to provide thermal protection. This enclosure is typically made of ceramic or glass which are brittle materials and do not support high levels of shock and vibration. In electrical circuitry using rigid connections, the rigidity of an external enclosure might not be required.

SUMMARY

According to an aspect of the disclosure, a battery may include a first terminal, a second terminal, a thermal fuse configured to connect to the first terminal and the second terminal, a first sleeving layer that is disposed on the thermal fuse, and that is configured to muffle an arc explosion of the thermal fuse and encapsulate molten material generated by the arc explosion of the thermal fuse, and a second sleeving layer that is disposed on the first sleeving layer, and that is configured to encapsulate the molten material generated by the arc explosion of the thermal fuse that penetrates the first sleeving layer.

According to an aspect of the disclosure, an overcurrent protection system may include a thermal fuse configured to connect to a first terminal and a second terminal of the battery, a first sleeving layer that is disposed on the thermal fuse, and that is configured to muffle an arc explosion of the thermal fuse and encapsulate molten material generated by the arc explosion of the thermal fuse, a second sleeving layer that is disposed on the first sleeving layer, and that is configured to encapsulate the molten material generated by the arc explosion of the thermal fuse that penetrates the first sleeving layer.

According to an aspect of the disclosure, a sleeving for a thermal fuse providing overcurrent protection for a battery may include a first sleeving layer that is disposed on the thermal fuse that connects a first terminal of the battery and a second terminal of the battery, and that is configured to muffle an arc explosion of the thermal fuse and encapsulate molten material generated by the arc explosion of the thermal fuse, and a second sleeving layer that is disposed on the first sleeving layer, and that is configured to encapsulate the molten material generated by the arc explosion of the thermal fuse that penetrates the first sleeving layer.

DETAILED DESCRIPTION

The following detailed description of example implementations refers to the accompanying drawings. The same reference numbers in different drawings may identify the same or similar elements.

Figure 1:
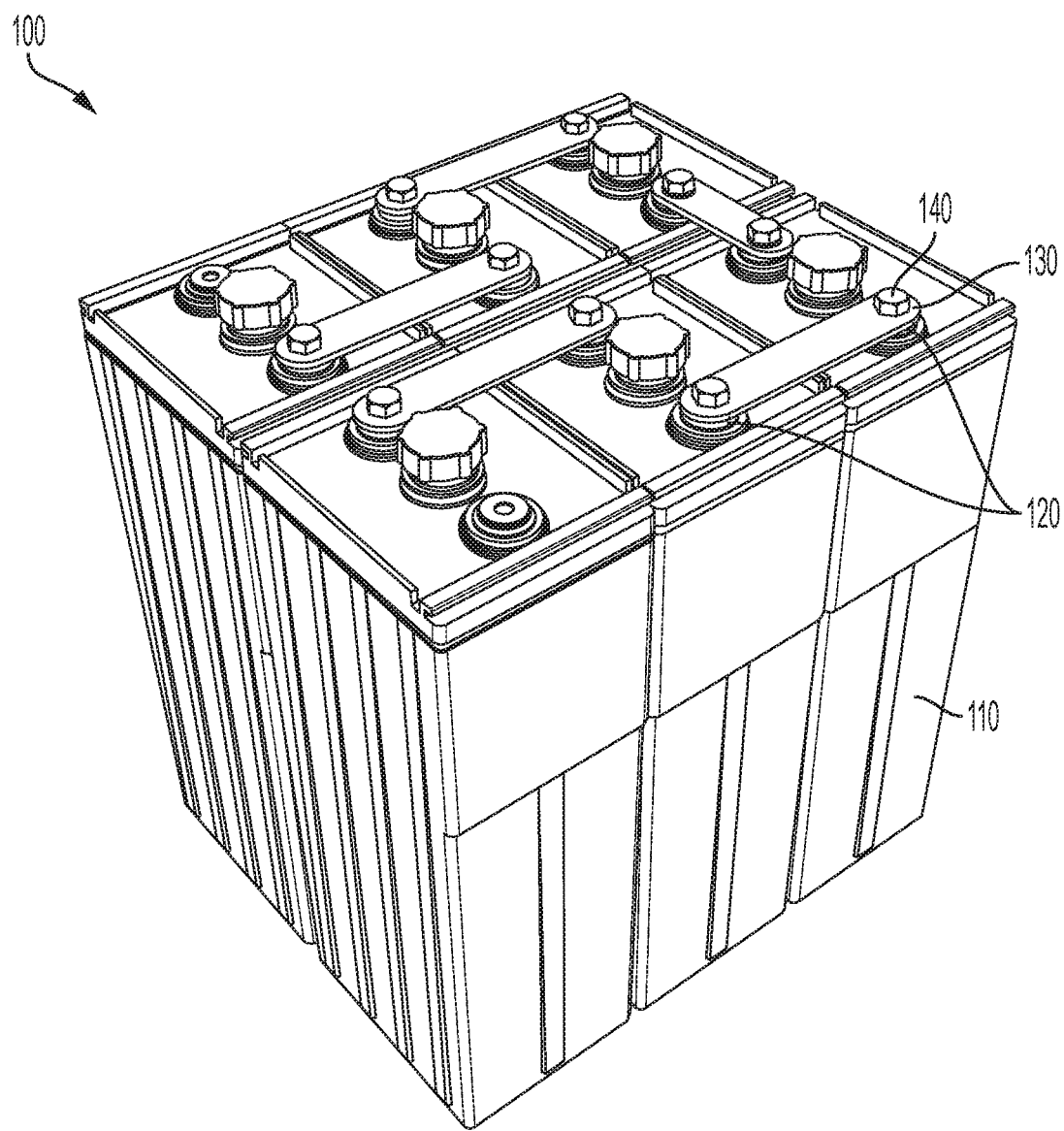
FIG. 1 is a perspective view of a battery.
Figure 2:
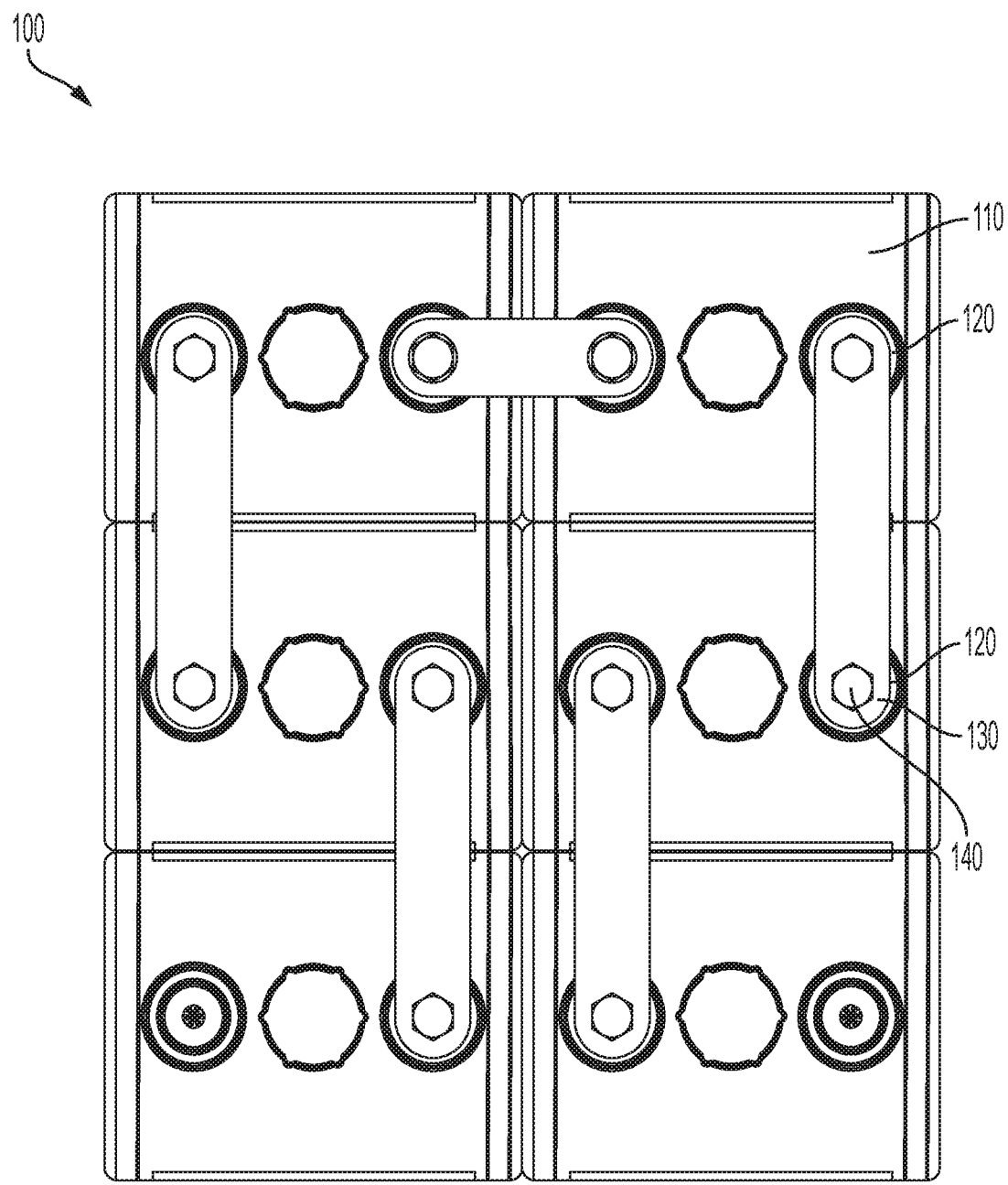
FIG. 2 is a top view of the battery shown in FIG. 1.

FIG. 1 is a perspective view of a battery, and FIG. 2 is a top view of the battery shown in FIG. 1. As shown in FIGS. 1 and 2, a battery 100 may include battery cells 110. Each battery cell 110 may include a set of terminals 120.

A connector 130 may connect a first terminal 120 of a first battery cell 110, and a second terminal 120 of a second battery cell 110. A first fastener 140 may secure the connector 130 to the first terminal 120, and a second fastener 140 may secure the connector 130 to the second terminal 120.

Figure 3:
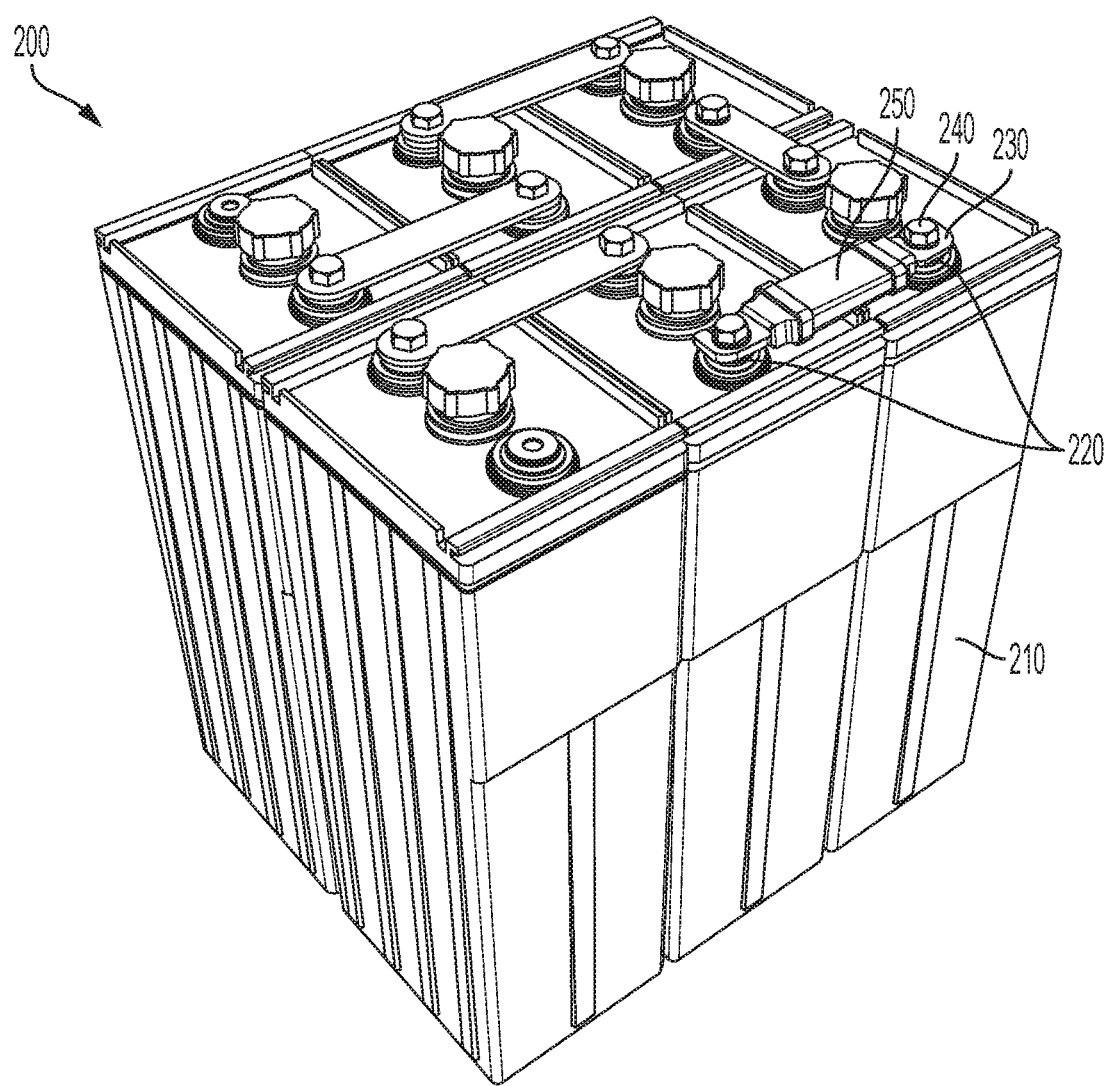
FIG. 3 is a perspective view of a battery according to an embodiment.
Figure 4:
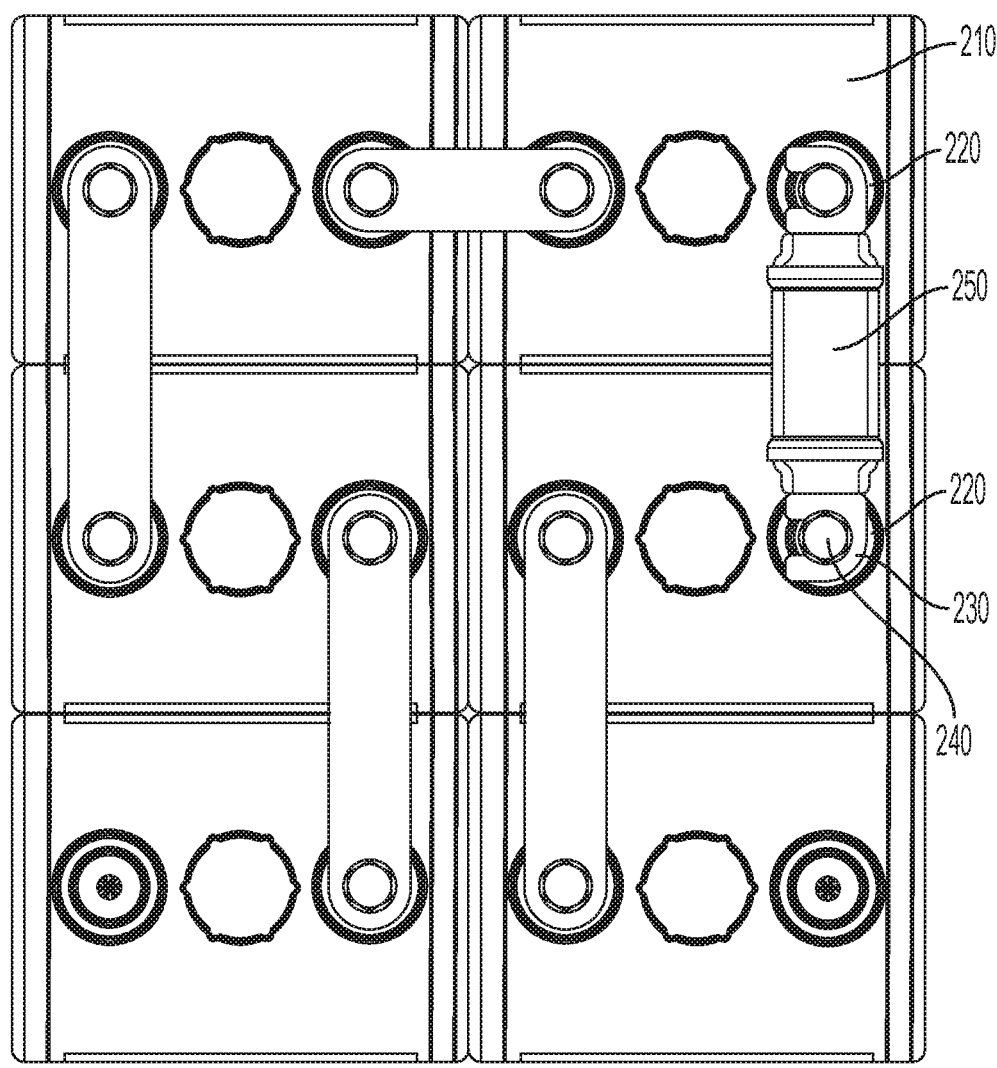
FIG. 4 is a top view of the battery shown in FIG. 3.

FIG. 3 is a perspective view of a battery according to an embodiment, and FIG. 4 is a top view of the battery shown in FIG. 3.

Figure 6:
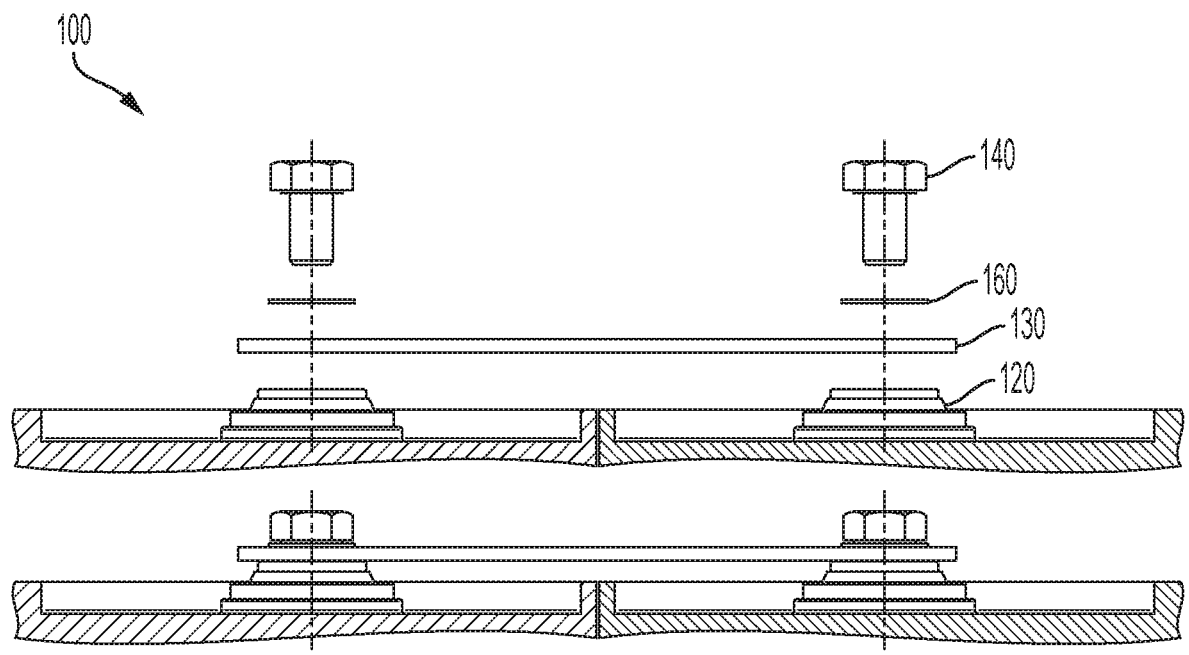
FIG. 6 is an exploded view of the battery shown in FIG. 1.
Figure 7:
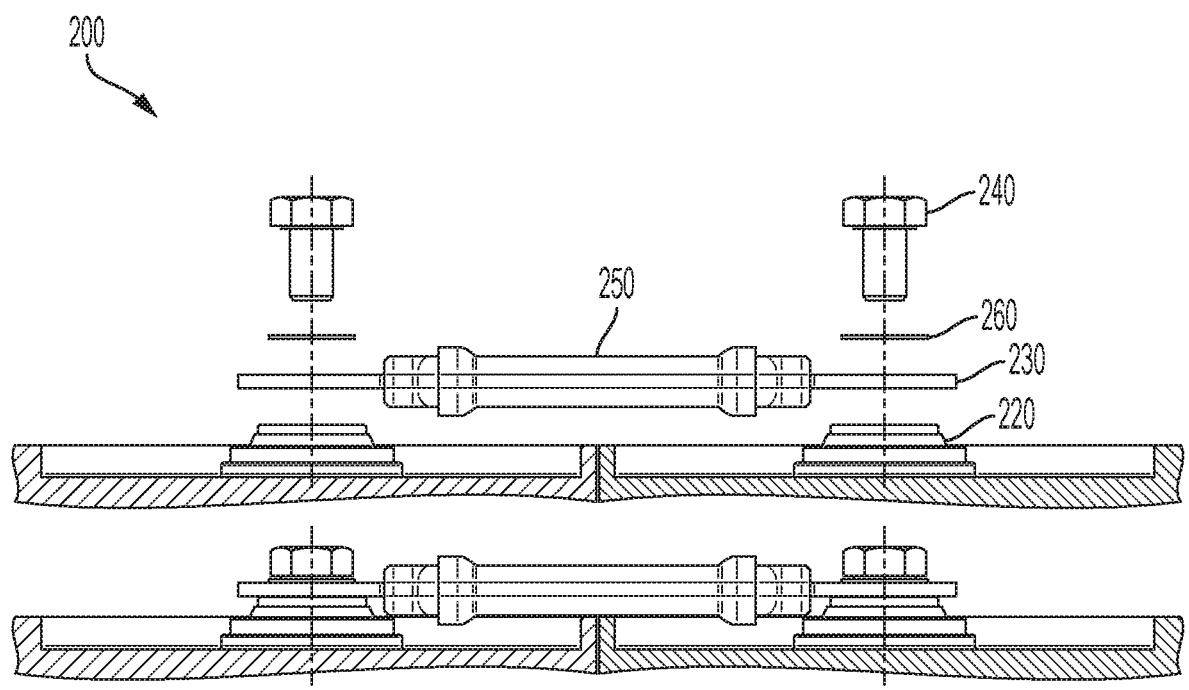
FIG. 7 is an exploded view of the battery shown in FIG. 3.

As shown in FIGS. 3 and 4, a battery 200 may include battery cells, electrochemical cells 210. A thermal fuse 230 may connect to a first terminal 220 of a first battery cell 210, and a second terminal 220 of a second battery cell 210. A first fastener 240 may secure the thermal fuse 230 to the first terminal 220, and a second fastener 240 may secure the thermal fuse 230 to the second terminal 220. A sleeving for the thermal fuse 230 may be disposed on the thermal fuse 230. As shown, a second sleeving layer 250 of the sleeving may be disposed on the thermal fuse 230, and may be the outermost layer of the sleeving, as discussed in greater detail below. As shown in FIGS. 3 and 4, the thermal fuse 230 may replace a connector 130 of the battery 100 as shown in FIGS. 1 and 2. In this way, the thermal fuse 230 may be implemented in association with the battery 100 by replacing a connector 130, and by utilizing substantially the same hardware as shown in FIGS. 6 and 7. The two terminals which the thermal fuse connects are not limited to the terminals of two different electrochemical cells. The first and second terminals can be any electrical connection point in a battery extended to a battery system, equipped with shunt, contactor, or any power management component like in lithium-ion battery. For example, the thermal fuse may be connected between an electrochemical cell terminal and a block connector terminal or a contactor terminal or a shunt terminal. The thermal fuse may be connected between a block connector terminal and a shunt terminal or a contactor terminal. The thermal fuse may be connected between a shunt terminal and a contactor terminal.

Figure 5:
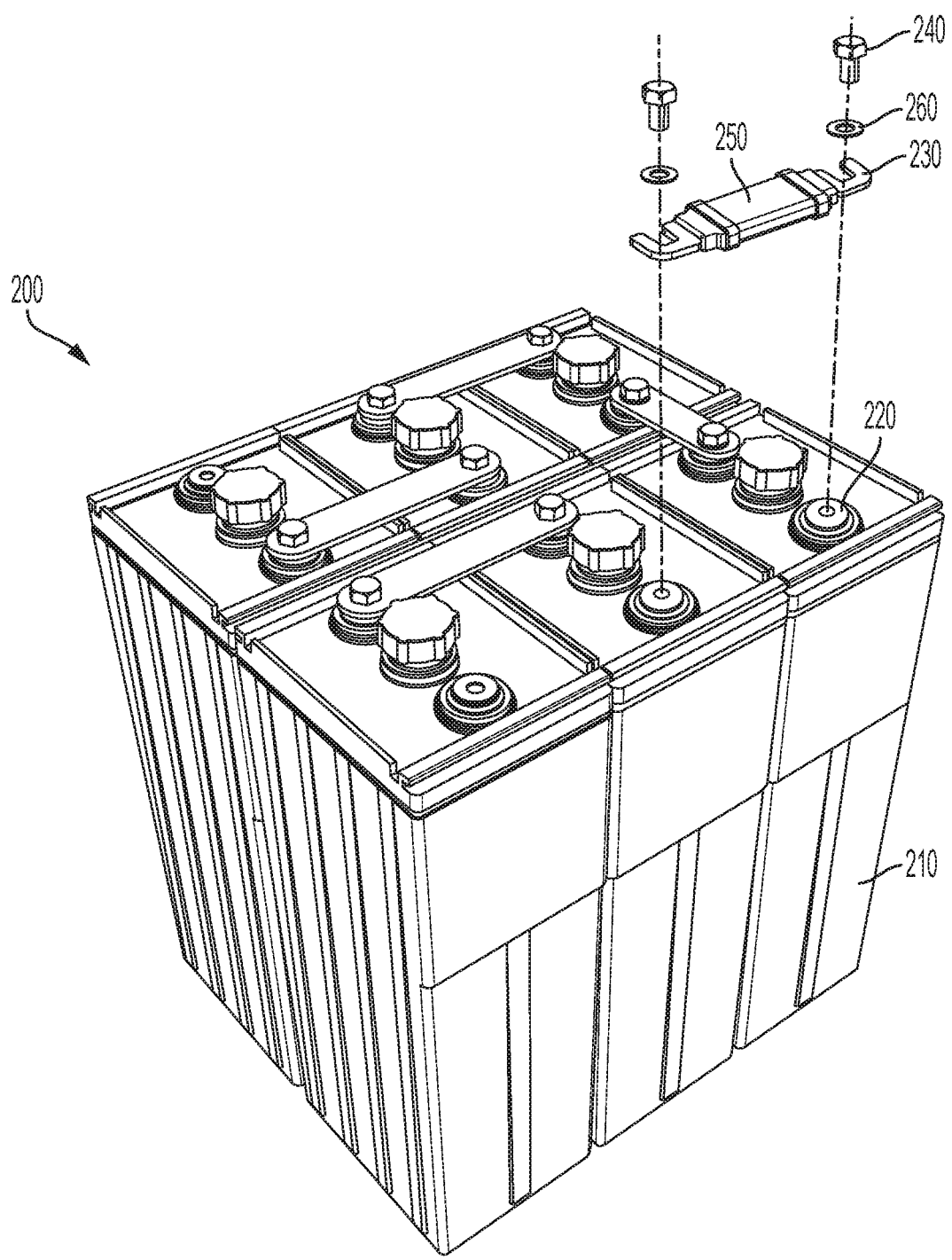
FIG. 5 is an exploded view of the battery shown in FIG. 3.

FIG. 5 is an exploded view of the battery shown in FIG. 3. As shown in FIG. 5, the thermal fuse 230 may be connected to respective terminals 220 of the battery cells 210 via holes in the thermal fuse 230. Then, washers 260 may be placed on the terminals 220 over the thermal fuse 230. Then, fasteners 240 may be placed on the terminals 220 over the washers 260. In this way, the thermal fuse 230, including the sleeving (e.g., with the second sleeving layer 250 being visible), may be connected to the battery cells 210.

FIG. 6 is an exploded view of a battery shown in FIG. 1. As shown in FIG. 6, the connector 130 may be connected to respective terminals 120 of the battery cells 110 via holes in the connector 130. Then, washers 160 may be placed on the terminals 120 over the connector 130. Then, fasteners 140 may be placed on the terminals 120 over the washers 160. In this way, the connector 130 may be connected to the battery cells 110.

FIG. 7 is an exploded view of the battery shown in FIG. 3. As shown in FIG. 7, the thermal fuse 230 may be connected to respective terminals 220 of the battery cells 210 via holes in the thermal fuse 230. Then, washers 260 may be placed on the terminals 220 over the thermal fuse 230. Then, fasteners 240 may be placed on the terminals 220 over the washers 260. In this way, the thermal fuse 230, including the sleeving (e.g., with the second sleeving layer 250 being visible), may be connected to the battery cells 210.

Figure 8:
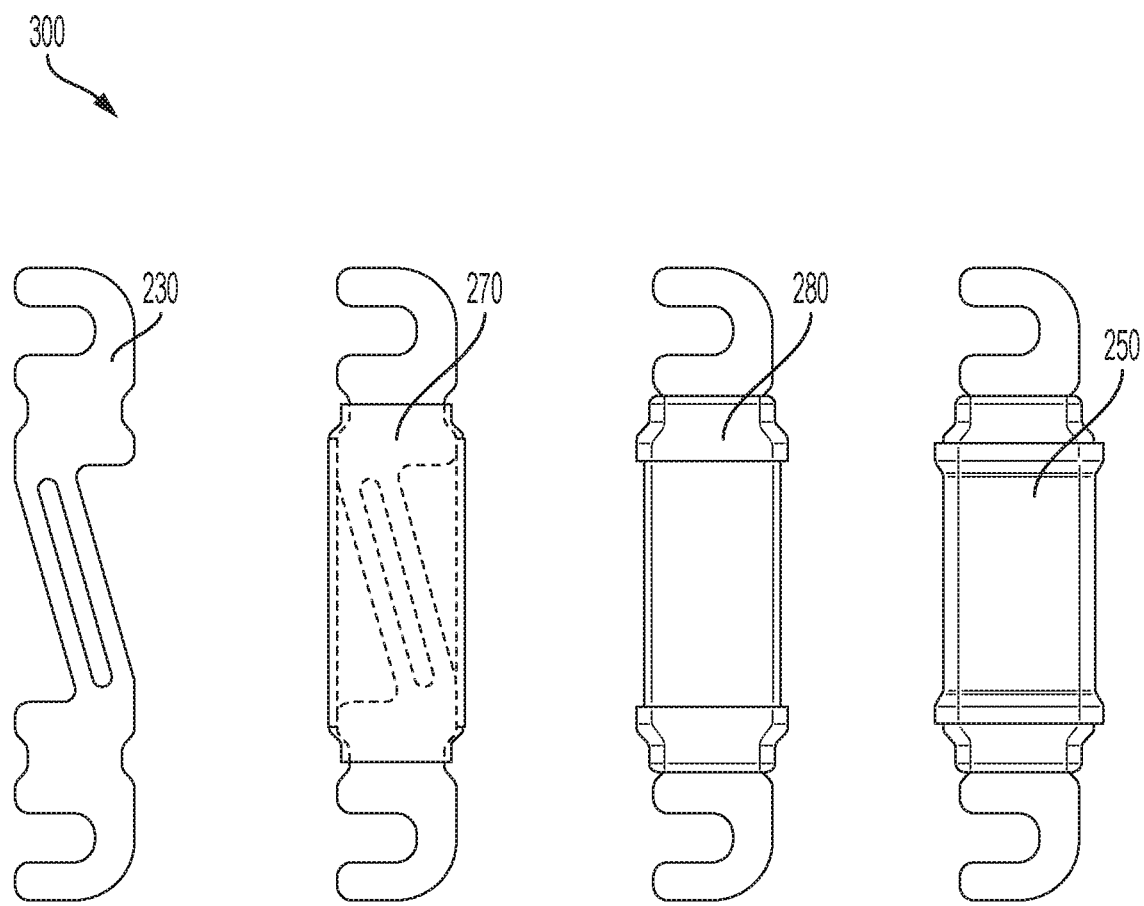
FIG. 8 is a top view of the construction of an overcurrent protection system according to an embodiment.
Figure 9:
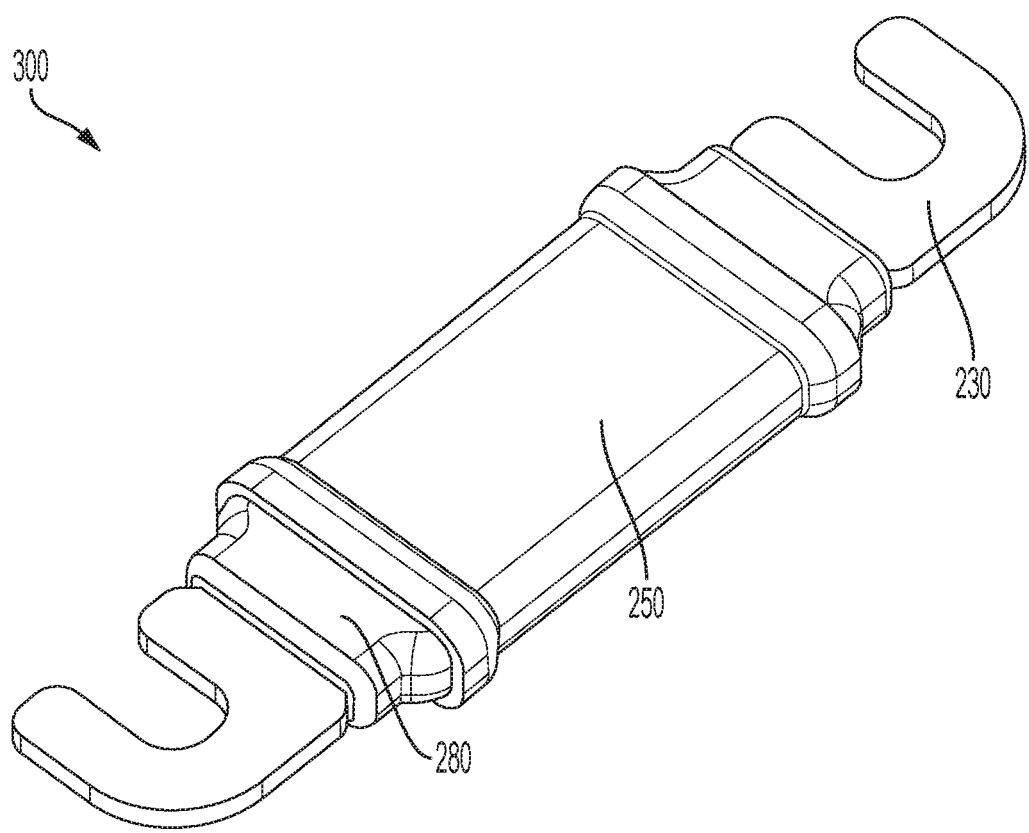
FIG. 9 is a perspective view of the overcurrent protection system shown in FIG. 8.

FIG. 8 is a top view of the construction of an overcurrent protection system according to an embodiment, and FIG. 9 is a perspective view of the overcurrent protection system shown in FIG. 8.

As shown in FIG. 8, an overcurrent protection system 300 may include a thermal fuse 230, a first sleeving layer 270, end covers 280, and a second sleeving layer 250. Although FIG. 8 depicts an overcurrent protection system 300 including two layers, it should be understood that other embodiments include a different number of layers than as shown in FIG. 8, such as a single layer, three layers, four layers, six layers, etc.

The overcurrent protection system 300 may be configured to provide overcurrent protection to battery 200. For example, the overcurrent protection system 300 may provide overcurrent protection to the battery 200 in the event of a short circuit of the battery 200.

The thermal fuse 230 may be configured to melt based on a threshold amount of current flowing through the thermal fuse 230. The thermal fuse 230 may be comprised of any suitable material, may include any suitable shape, and may include any type of fusing section to permit the thermal fuse 230 to provide overcurrent protection.

The first sleeving layer 270 may be configured to muffle an arc explosion of the thermal fuse 230, and encapsulate molten material generated by the arc explosion of the thermal fuse 230. A short circuit of the battery 200 may cause an arc explosion of the thermal fuse 230, and may cause the thermal fuse 230 to melt to generate molten material. The first sleeving layer 270 may muffle the arc explosion, and may encapsulate some or all of the generated molten material.

The first sleeving layer 270 may be comprised of any suitable material, such as a fiber-reinforced polymer (FRP), a carbon FRP (CFRP), aramid, basalt, etc. For example, the first sleeving layer 270 may be braided fiberglass. The first sleeving layer 270 may be disposed on the thermal fuse 230.

The second sleeving layer 250 may be configured to encapsulate molten material generated by an arc explosion of the thermal fuse 230 that may have permeated the first sleeving layer 270. For example, the second sleeving layer 250 may provide redundancy to encapsulate molten material generated by an arc explosion that may have permeated the first sleeving layer 270.

The second sleeving layer 250 may be comprised of any suitable material, such as FRP, CFRP, aramid, basalt, etc. Further, the second sleeving layer 250 may be a high-temperature resistant material, such as silicone coated fiberglass. The second sleeving layer 250 may be disposed on the first sleeving layer 270. In this way, the sleeving may include the first sleeving layer 270 and the second sleeving layer 250.

Other embodiments may include different numbers of sleevings. For example, in some cases, the first sleeving layer 270 and the second sleeving layer 250 may form an integrated sleeving layer.

As shown in FIGS. 8 and 9, the first sleeving layer 270 and the second sleeving layer 250 may be substantially tubular in shape. For example, the first sleeving layer 270 and the second sleeving layer 250 may respectively include open ends, and a tubular body. In other embodiments, the first sleeving layer 270 and the second sleeving layer 250 may include different shapes.

The first sleeving layer 270 and the second sleeving layer 250 may include substantially the same shape and length. For example, the second sleeving layer 250 may be disposed on the first sleeving layer 270 to cover substantially all of the first sleeving layer 250. In other embodiments, the first sleeving layer 270 and the second sleeving layer 250 may include different shapes and/or sizes. For example, the second sleeving layer 250 may cover a subset of the first sleeving layer 270, the first sleeving layer 270 may include a length that is less than a length of the second sleeving layer 250, or the like.

The first sleeving layer 270 and the second sleeving layer 250 may respectively be flexible. Alternatively, the first sleeving layer 270 and the second sleeving layer 250 may be substantially rigid. The thermal fuse 230 may be rigid, flexible, or the like. In any event, the first sleeving layer 270 and the second sleeving layer 250 may be configured to be capable of being disposed on the thermal fuse 230, and provide protection in the event of an arc explosion of the thermal fuse 230.

The end covers 280 may be configured to cover ends of the first sleeving layer 270. For example, the end covers 280 may be disposed on open ends of the first sleeving layer 270 to cover the open ends of the first sleeving layer 270. The end covers 280 may be comprised of any suitable material, such as polyolefin heat shrink tubing, or the like. The second sleeving layer 250 may be disposed on the end covers 280, such that the end covers 280 cover open ends of the first sleeving layer 270 and the second sleeving layer 250.

Figure 10:
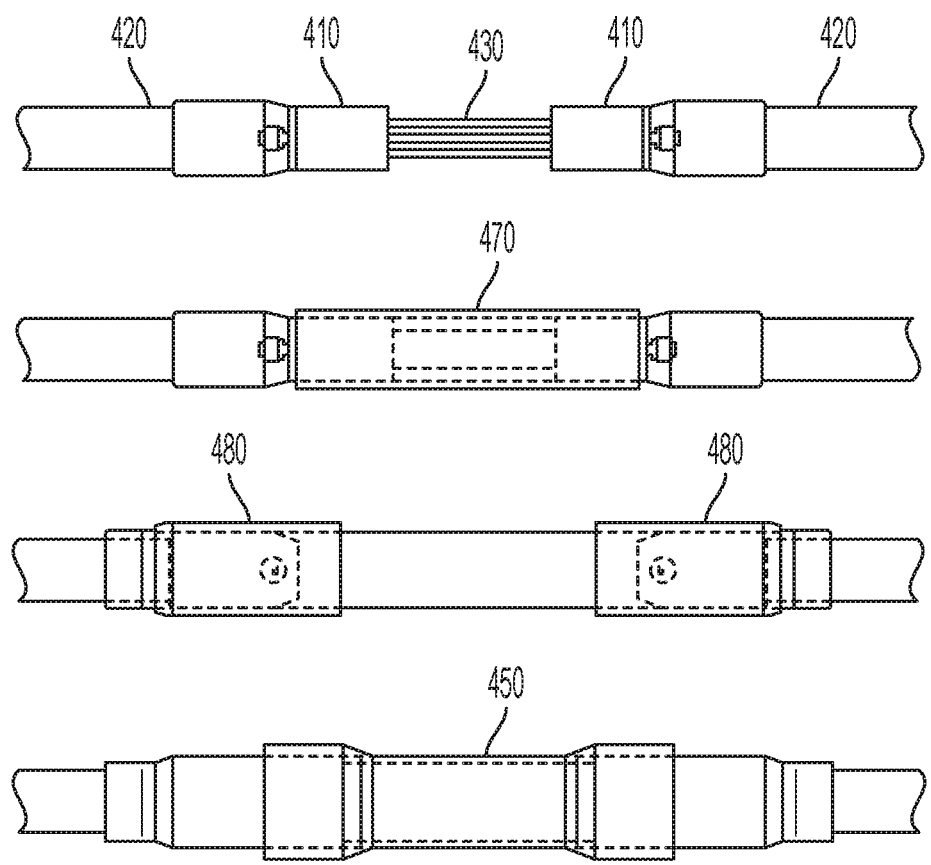
FIG. 10 is a top view of the construction of an overcurrent protection system according to an embodiment.
Figure 11:
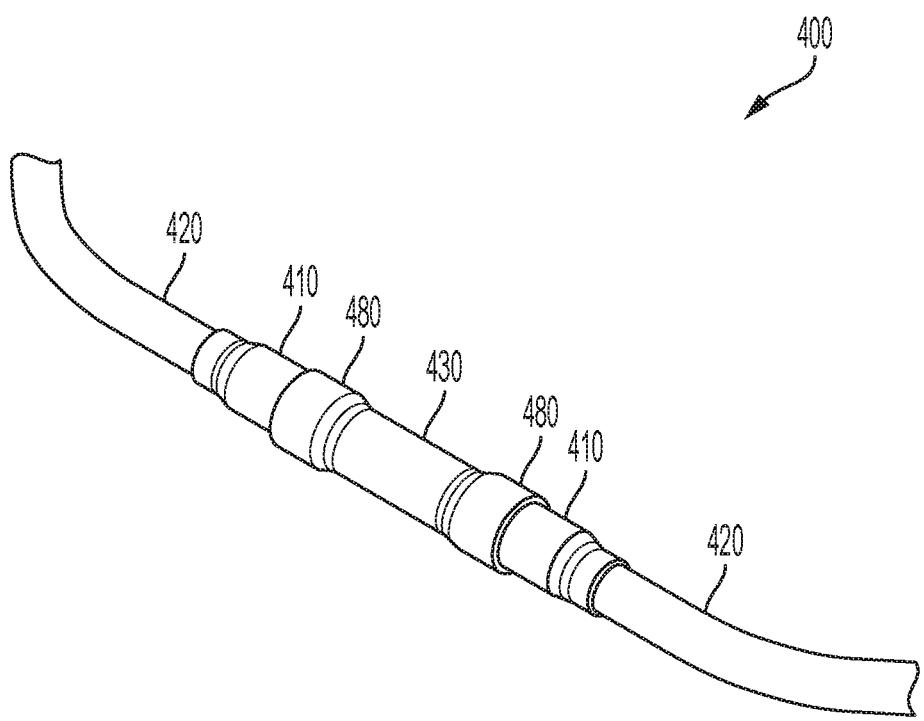
FIG. 11 is a perspective view of the overcurrent protection system shown in FIG. 10.

FIG. 10 is a top view of the construction of an overcurrent protection system according to an embodiment, and FIG. 11 is a perspective view of the overcurrent protection system shown in FIG. 10. As shown in FIGS. 10 and 11, an overcurrent protection system 400 may include a thermal fuse 430, connectors 410, cables 420, a first sleeving layer 470, covers 480, and a second sleeving layer 450.

As shown, a first cable 420 is connected to a first end of the thermal fuse 430 via a first connector 410. A second cable 420 is connected to a second end of the thermal fuse 430 via a second connector 410. The first sleeving layer 470 is disposed on the thermal fuse 430, and partially overlaps the first connector 410 and the second connector 410 to form overlapping portions. The end covers 480 are disposed on the overlapping portions. Then, the second sleeving layer 450 is disposed on the first sleeving layer 470 and the end covers 480.

In this way, the overcurrent protection system 400 may be configured to be used in connection with flexible cables 420, or other types of flexible connections.

Experimental testing was performed in connection with various embodiments of the disclosure. For example, a low and high impedance short circuit test at 27 VDC was performed, a short circuit test up to 4,000 A was performed, a shock and vibration, acceleration load test was performed, and a fluid resistance to pesticide and alcohols test was performed. The overcurrent protection systems according to various embodiments of the disclosure were not affected by shock, or vibration.

The foregoing disclosure provides illustration and description, but is not intended to be exhaustive or to limit the implementations to the precise form disclosed. Modifications and variations are possible in light of the above disclosure or may be acquired from practice of the implementations.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related and unrelated items, etc.), and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A battery, comprising:
a first terminal;
a second terminal;
a thermal fuse configured to connect to the first terminal and the second terminal;
a first sleeving layer that is disposed on the thermal fuse, and that is configured to muffle an arc explosion of the thermal fuse and encapsulate molten material generated by the arc explosion of the thermal fuse; and
a second sleeving layer that is disposed on the first sleeving layer, and that is configured to encapsulate the molten material generated by the arc explosion of the thermal fuse that penetrates the first sleeving layer,
wherein the battery comprising two or more electrochemical cells, the first terminal is a terminal of a first electrochemical cell and the second terminal is a terminal of a second electrochemical cell.

2. The battery of claim 1, wherein the first sleeving layer comprises braided fiberglass.

3. The battery of claim 1, wherein the second sleeving layer comprises silicone coated fiberglass.

4. The battery of claim 1, wherein the sleeving is flexible.

5. The battery of claim 1, further comprising:
a first end cover that covers a first opening of the first sleeving layer and the thermal fuse; and
a second end cover that covers a second opening of the first sleeving layer and the thermal fuse.

6. The battery of claim 1, wherein the first sleeving layer and the second sleeving layer are both substantially tubular in shape.

7. The battery of claim 1, wherein the thermal fuse is rigid or flexible.

8. An overcurrent protection system for a battery, the overcurrent protection system comprising:
a thermal fuse configured to connect to a first terminal and a second terminal of the battery;
a first sleeving layer that is disposed on the thermal fuse, and that is configured to muffle an arc explosion of the thermal fuse and encapsulate molten material generated by the arc explosion of the thermal fuse;
a second sleeving layer that is disposed on the first sleeving layer, and that is configured to encapsulate the molten material generated by the arc explosion of the thermal fuse that penetrates the first sleeving layer;
a first end cover that covers a first opening of the first sleeving layer and the thermal fuse; and
a second end cover that covers a second opening of the first sleeving layer and the thermal fuse.

9. The overcurrent protection system of claim 8, wherein the first sleeving layer comprises braided fiberglass.

10. The overcurrent protection system of claim 8, wherein the second sleeving layer comprises silicone coated fiberglass.

11. The overcurrent protection system of claim 8, wherein the sleeving is flexible.

12. The overcurrent protection system of claim 8, wherein the first sleeving layer and the second sleeving layer are both substantially tubular in shape.

13. An overcurrent protection system for a battery comprising:
a thermal fuse configured to connect to a first cable and a second cable of the battery;
a first sleeving layer that is disposed on the thermal fuse, and that is configured to muffle an arc explosion of the thermal fuse and encapsulate molten material generated by the arc explosion of the thermal fuse;
a second sleeving layer that is disposed on the first sleeving layer, and that is configured to encapsulate the molten material generated by the arc explosion of the thermal fuse that penetrates the first sleeving layer;
a first end cover that covers a first opening of the first sleeving layer and the thermal fuse; and
a second end cover that covers a second opening of the first sleeving layer and the thermal fuse.

14. The overcurrent protection system of claim 13, wherein the first sleeving layer comprises braided fiberglass.

15. The overcurrent protection system of claim 13, wherein the second sleeving layer comprises silicone coated fiberglass.

16. The overcurrent protection system of claim 13, further comprising:
- a first connector that connects the first cable to a first end of the thermal fuse; and
- a second connector that connects the second cable to a second end of the thermal fuse.

17. A battery comprising one or more overcurrent protection systems of claim claim 8.

* * * * *